Nov. 8, 1960    H. POMERNACKI    2,959,282
GEAR TESTING MACHINE
Filed April 17, 1956    11 Sheets-Sheet 3
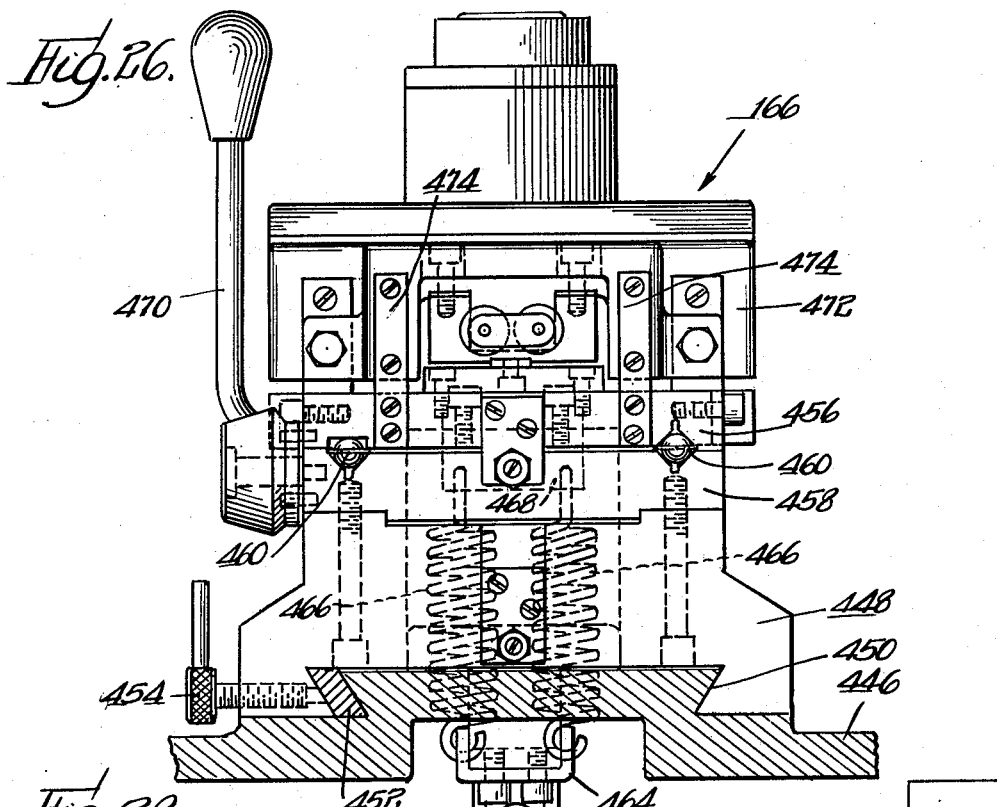
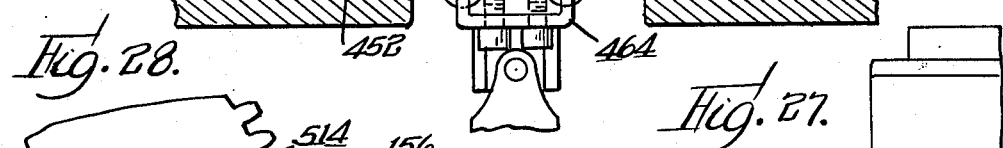
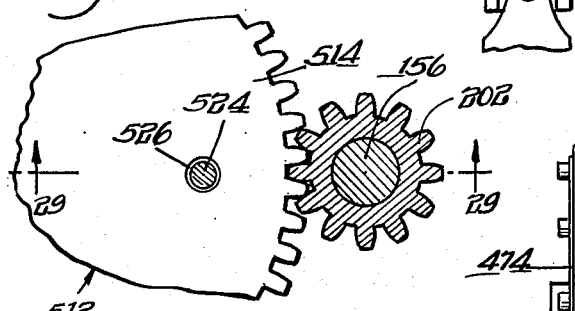
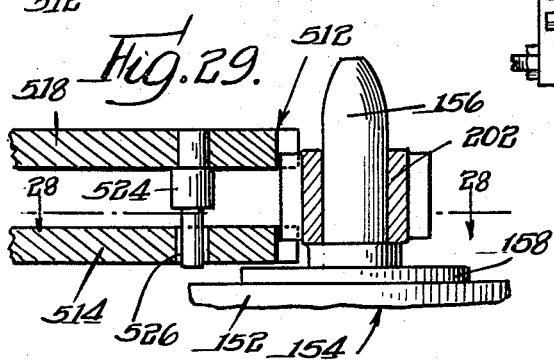
INVENTOR.
Henry Pomernacki
BY
Olson & Trexler
Attys.

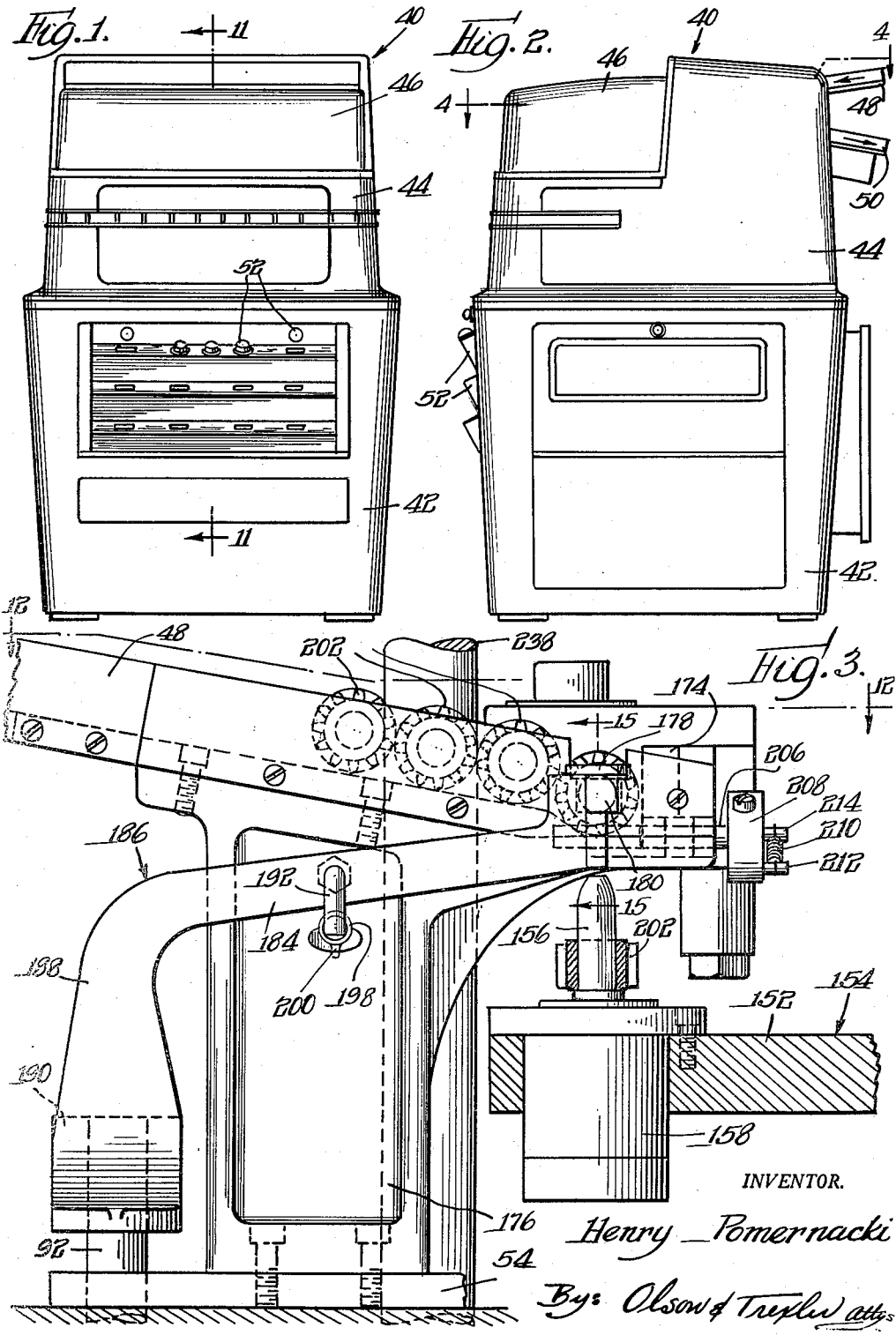

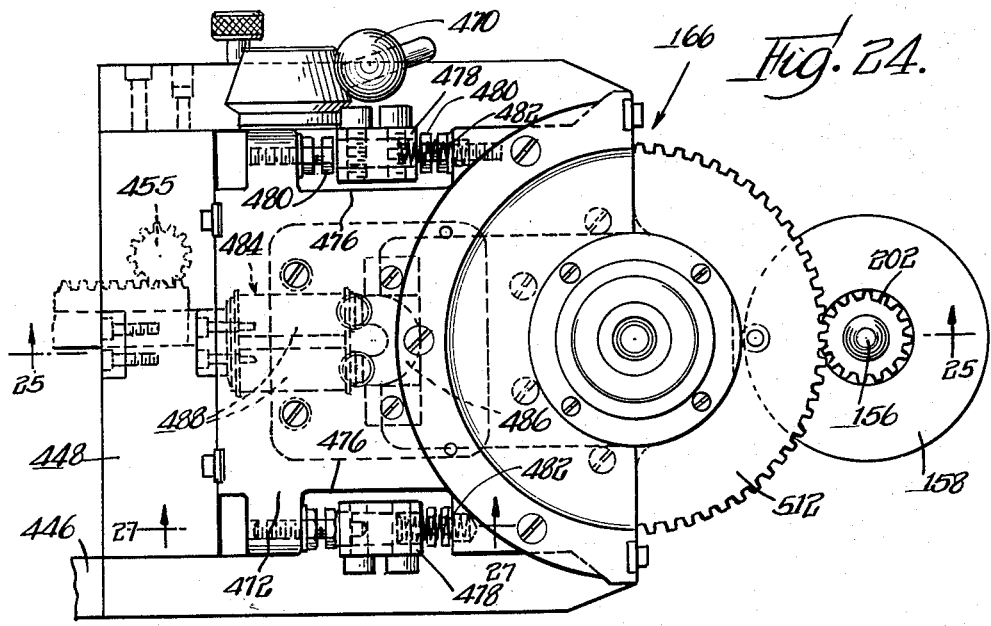
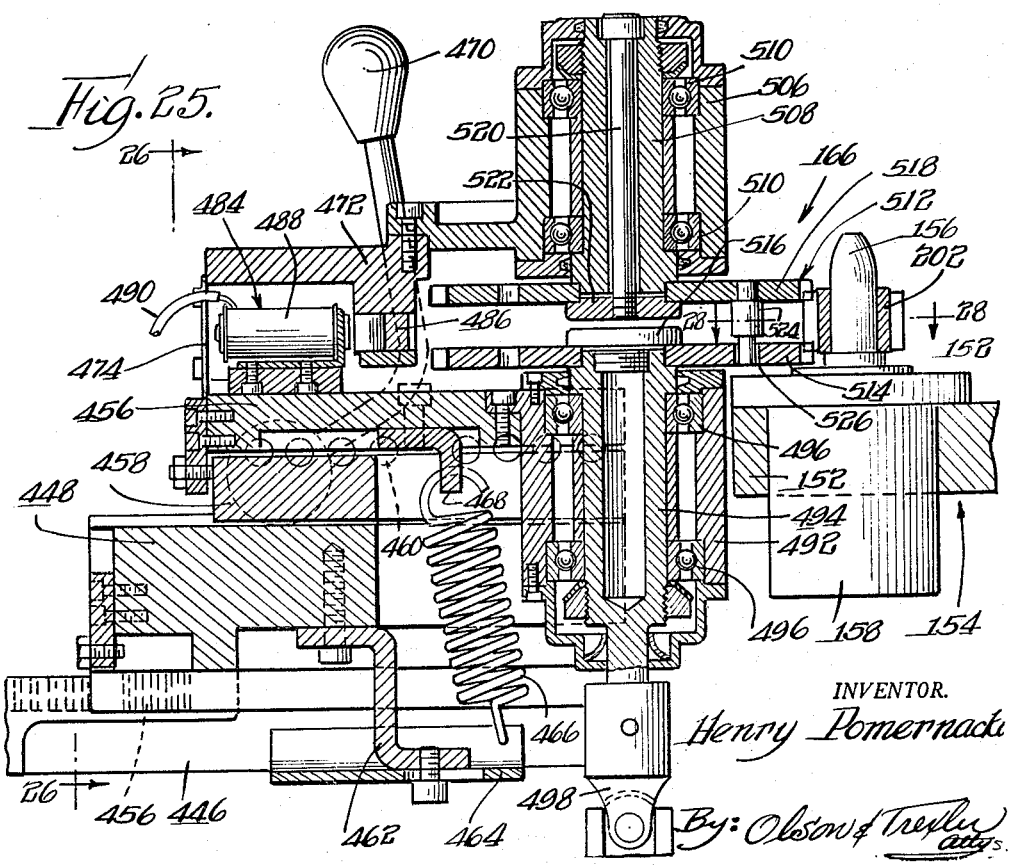

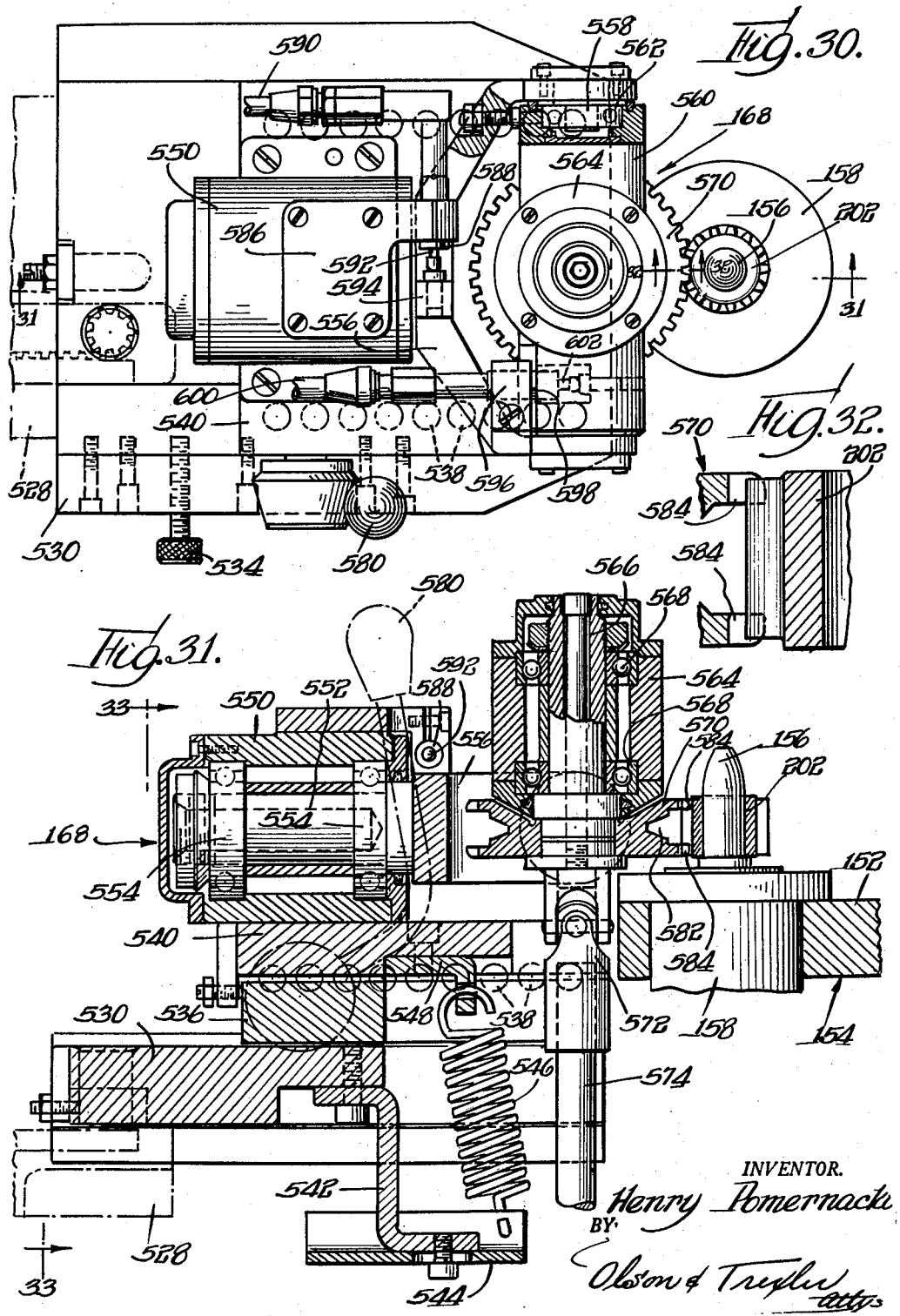

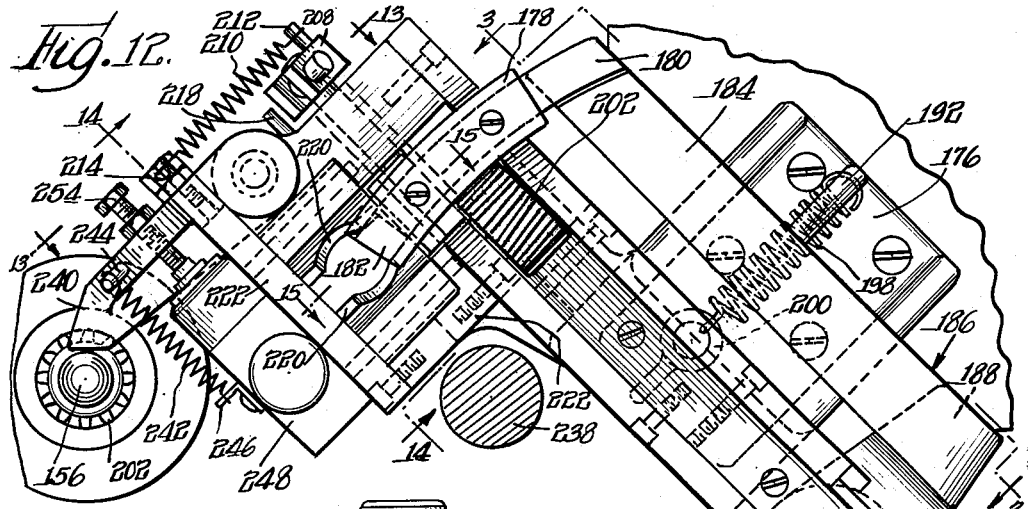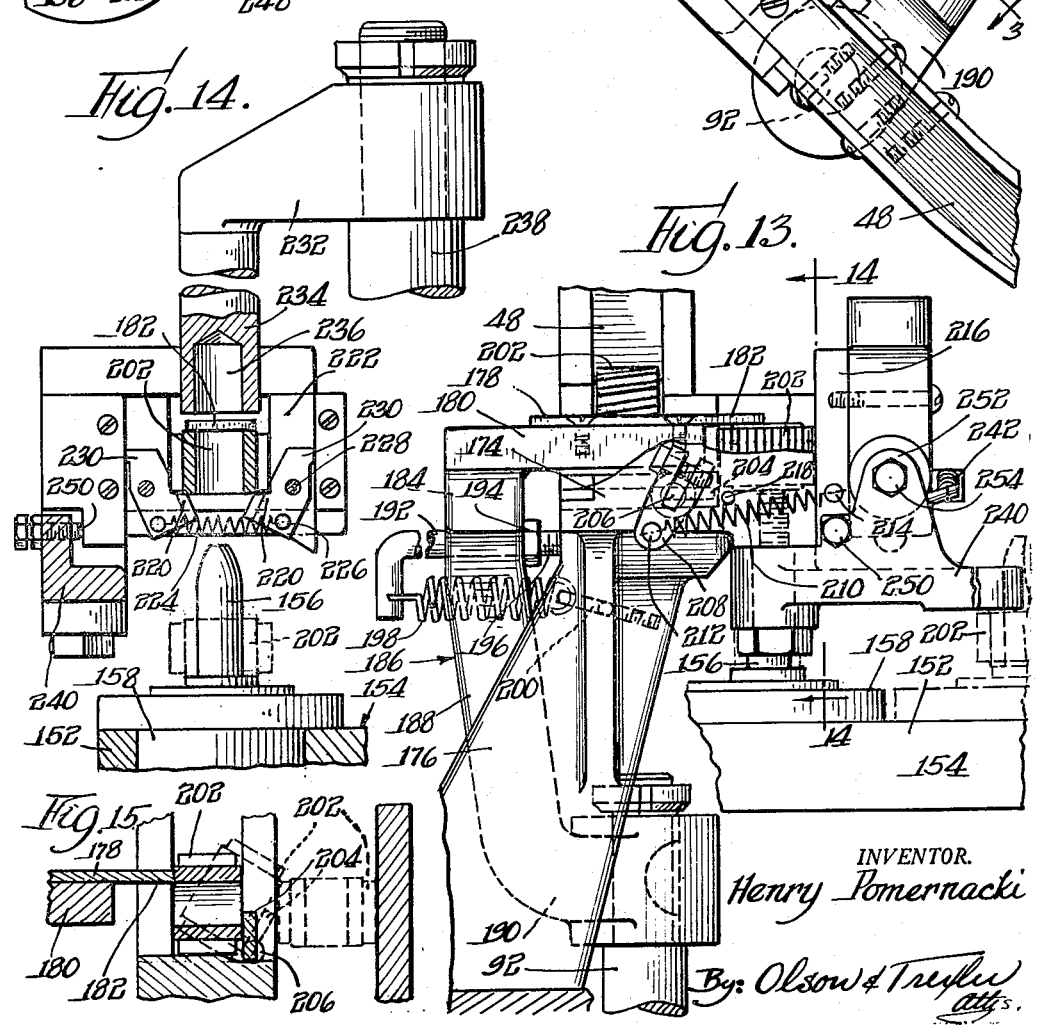

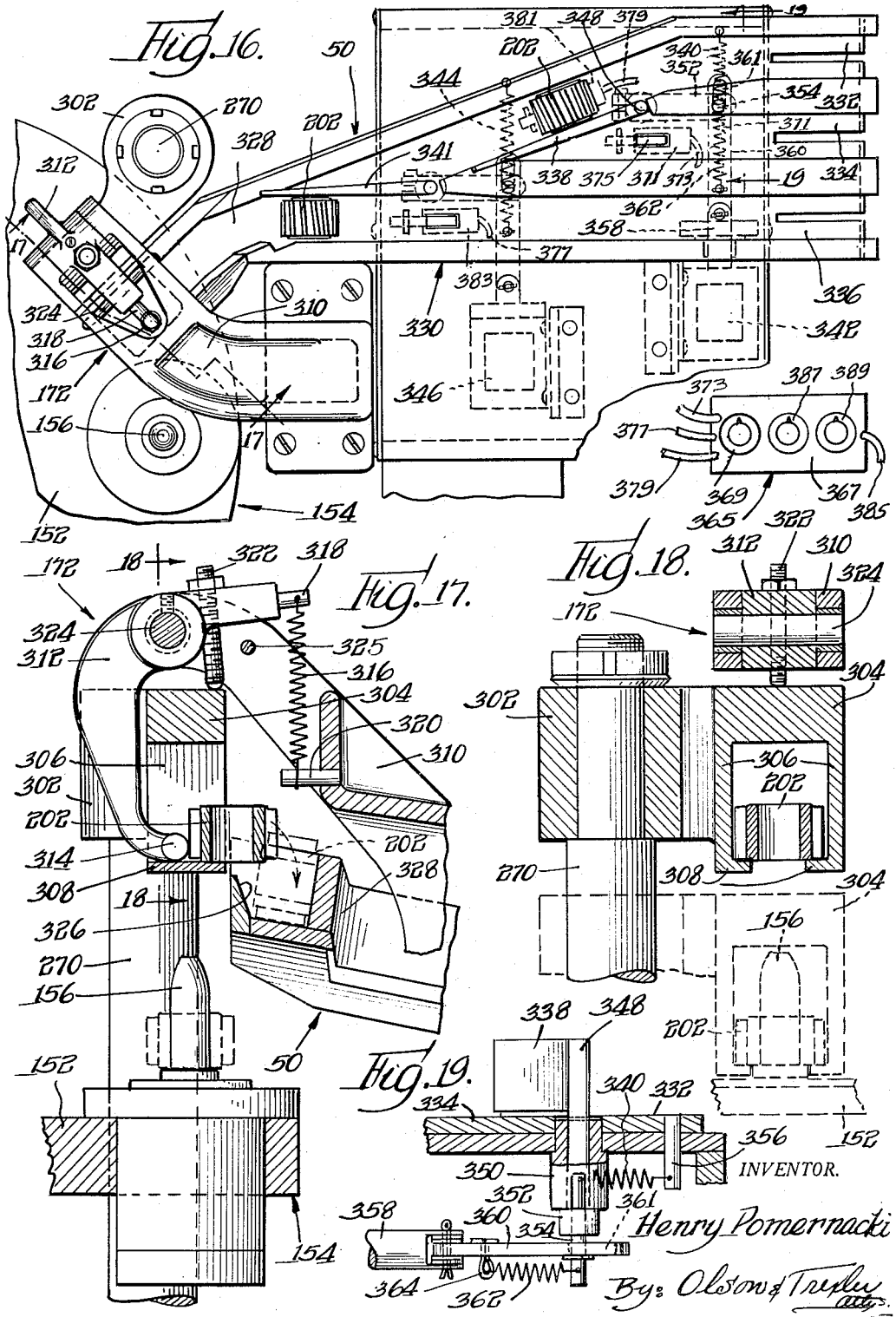

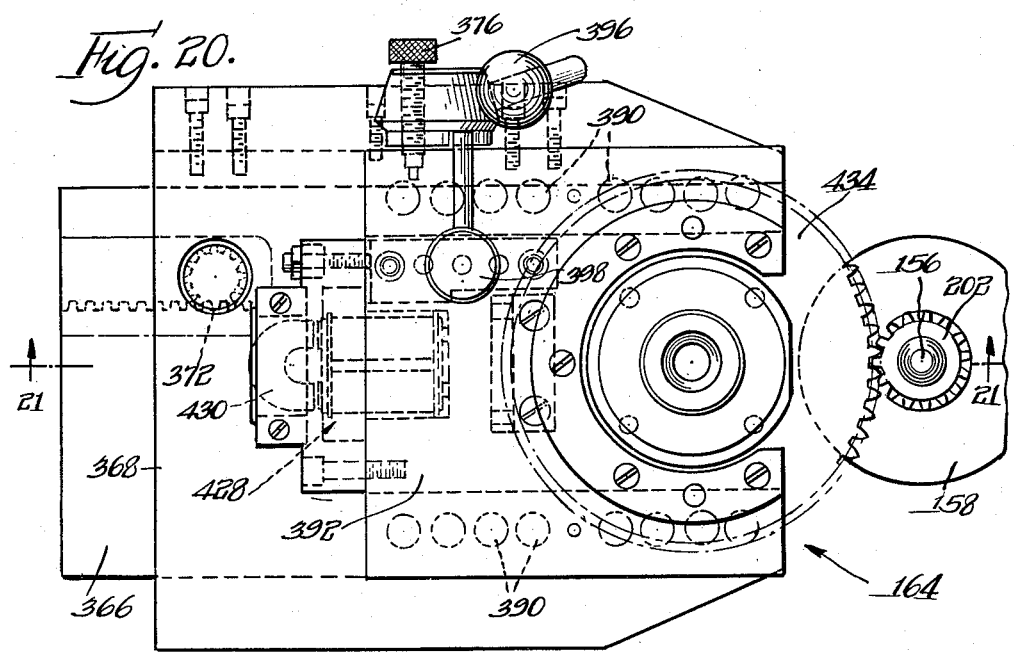
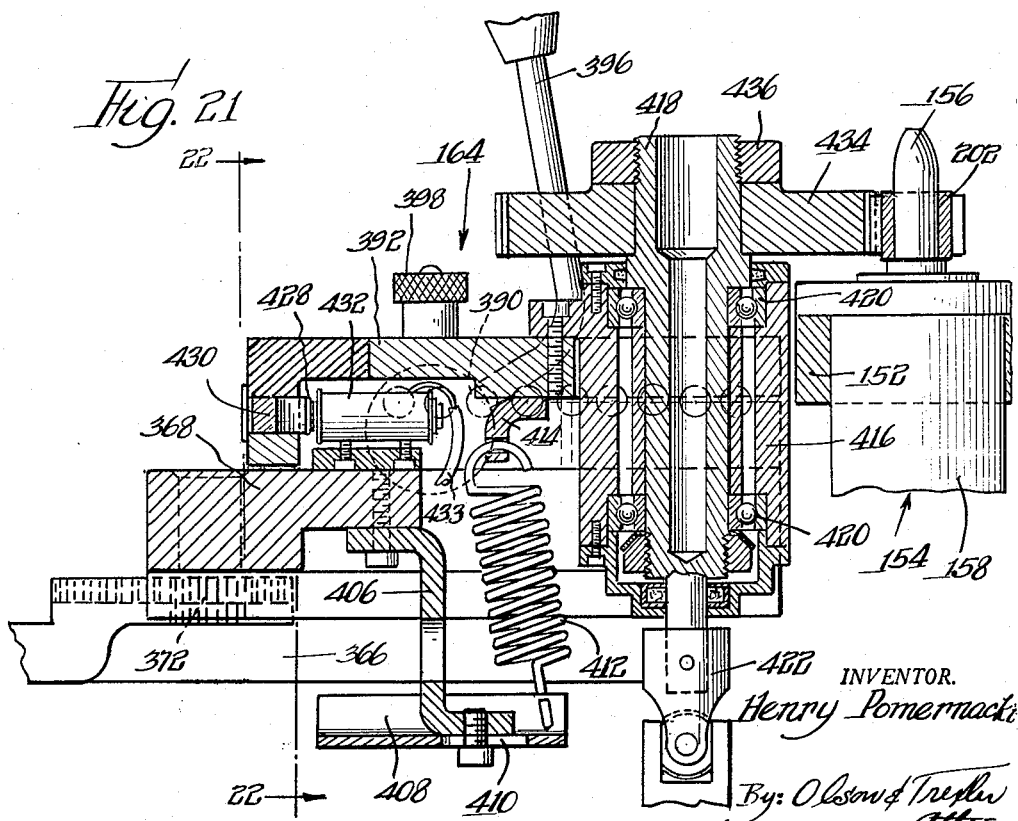

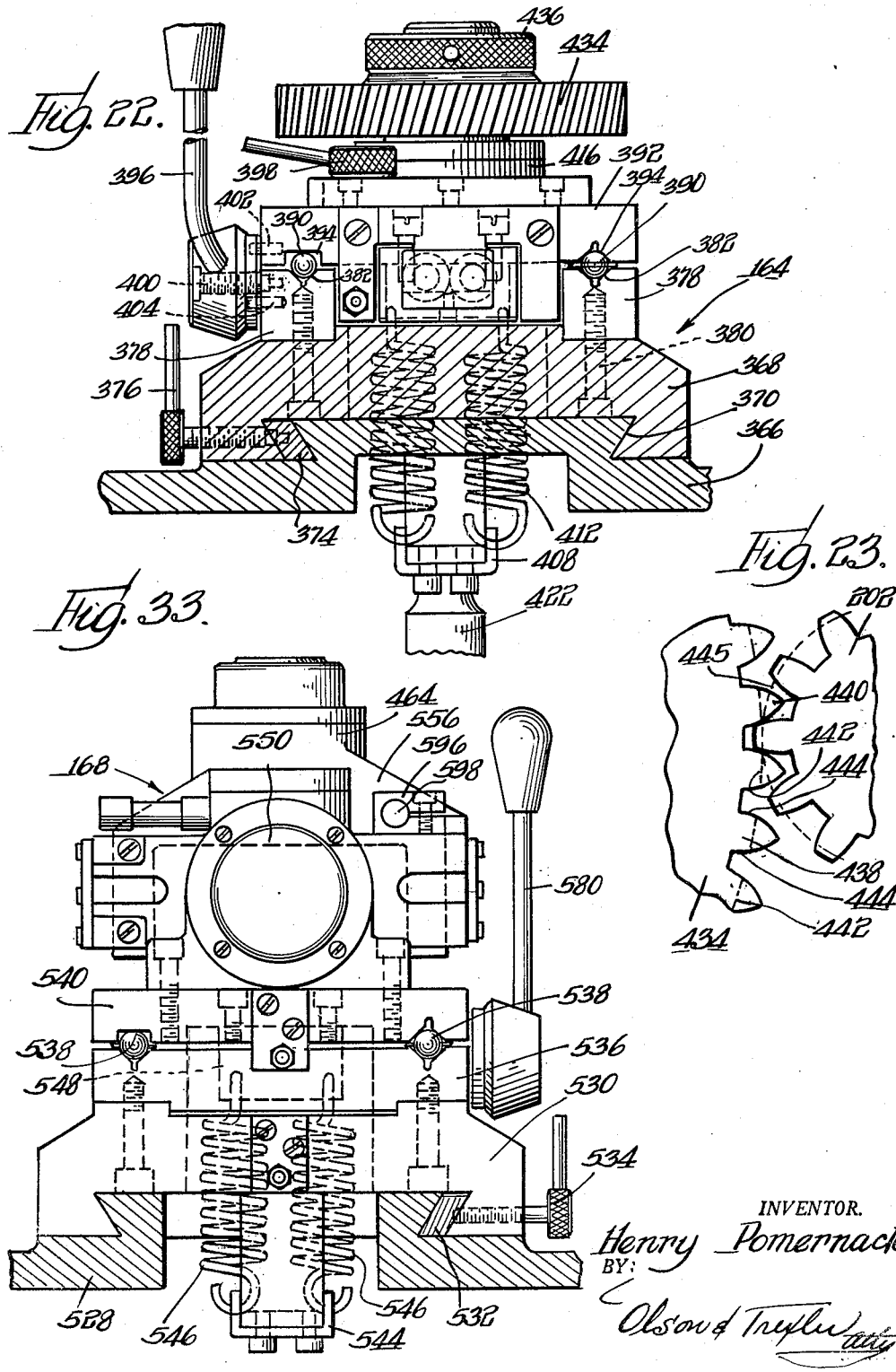

INVENTOR.
Henry Pomernacki

By: Olson & Trexler attys

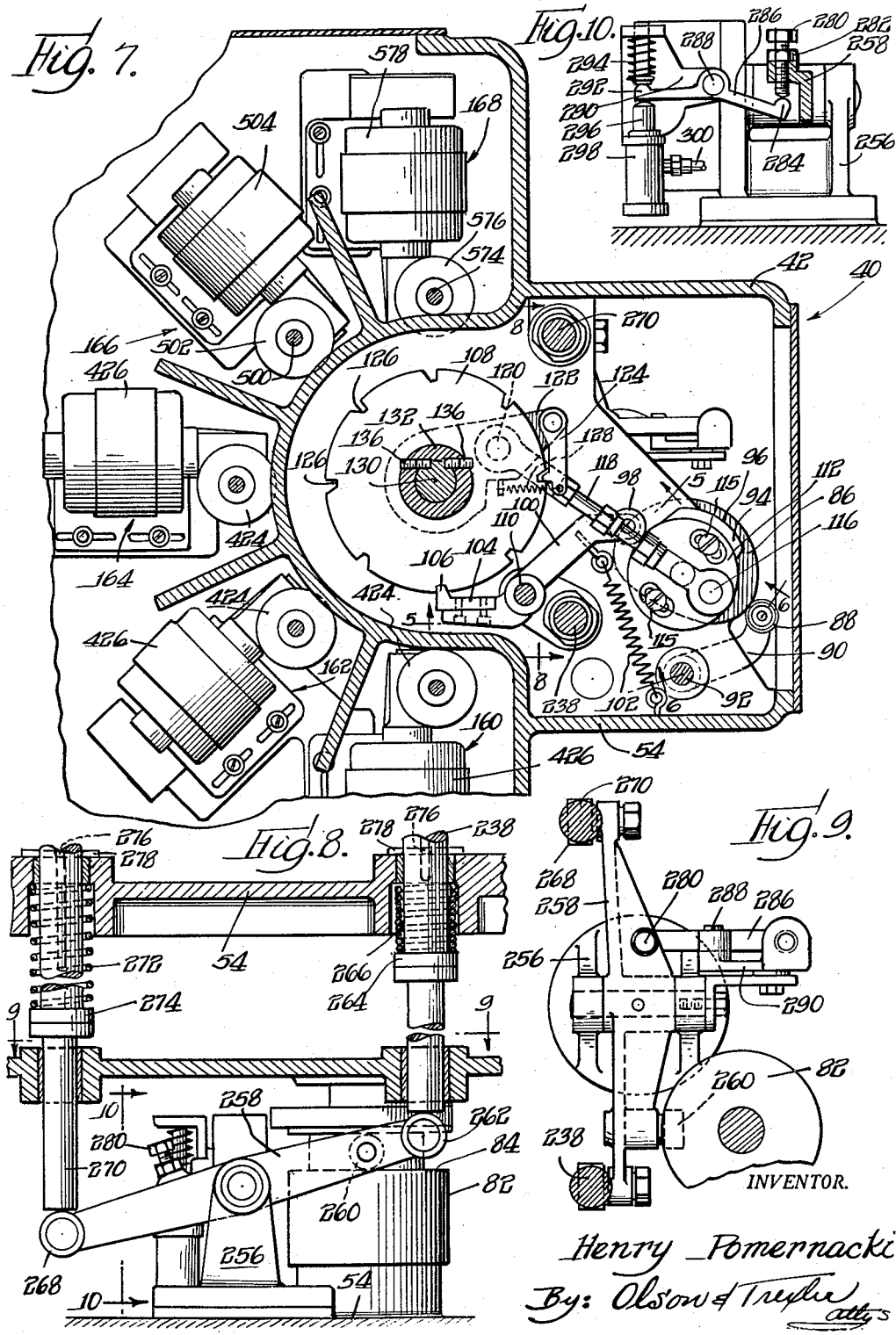

Nov. 8, 1960   H. POMERNACKI   2,959,282
GEAR TESTING MACHINE
Filed April 17, 1956   11 Sheets-Sheet 11

INVENTOR.
Henry Pomernacki
By: Olson & Trexler attys

United States Patent Office 2,959,282
Patented Nov. 8, 1960

2,959,282

GEAR TESTING MACHINE

Henry Pomernacki, Chicago, Ill., assignor to Illinois Tool Works, Chicago, Ill., a corporation of Illinois Filed Apr. 17, 1956, Ser. No. 578,675

17 Claims. (Cl. 209—88)

This invention relates generally to the art of gear manufacturing, and more specifically is concerned with a novel apparatus for checking gears for various errors that might render them unacceptable.

As is well known, manufacturing of gears to close tolerances is quite expensive, and much of the expense is encountered in the final or inspection stage wherein satisfactory and unsatisfactory gears are separated. Much of the expense involved in checking gears results from the large amount of hand labor necessary. With most gear checking apparatus heretofore developed, it is necessary for an operator to mount each gear to be checked in the apparatus, then to actuate the apparatus, and finally to dismount the checked gear. This procedure is relatively slow and cumbersome, and requires practically full time attendance of the operator to the apparatus. Various semiautomatic machines have required at least some steps of manual operation, while machines of a more or less automatic nature have been capable of checking for only a limited number of types of errors.

There are a greater number of errors that can render a gear unsatisfactory. Runout, tooth to tooth spacing, nicks, and center hole size are important in all gears. This is true both as to the front and back faces of the gear teeth. In helical gears, additional factors enter in such as the maximum lead, the angular velocity or variation in lead, and helical carry over. Average lead and average taper also must be considered.

It is an object of this invention to provide a machine for checking gears for all of the possible errors noted above.

More specifically, it is an object of this invention to provide such a gear checking machine which is entirely automatic, requiring no manual operation or attention.

A further object of this invention is to provide a gear checking machine having a plurality of separate stations for checking various possible gear errors, wherein a carrier moves past all of said stations and is automatically loaded and unloaded.

It is a further object of this invention to provide an automatic gear checking machine wherein gears are successively loaded automatically onto a rotary carrier for planetary movement past a plurality of gear checking stations, wherein the gears after checking are automatically unloaded and separated into acceptable and nonacceptable groups.

Other and further objects and advantages of the present invention will be apparent from the following description when taken in connection with the accompanying drawings wherein:

Fig. 1 is a front view of a machine constructed in accordance with the principles of this invention;

Fig. 2 is a side view thereof;

Fig. 3 is a side view of the loading station with certain parts shown in section as taken substantially along the line 3—3 in Fig. 4 and in Fig. 12;

Fig. 7 is a horizontal sectional view taken along the line 7—7 of Fig. 11 showing certain of the driving parts;

Fig. 8 is a vertical sectional view taken along the line 8—8 in Fig. 7 and showing the driving mechanism for the loading and unloading stations;

Fig. 9 is a horizontal sectional view of this mechanism as taken along the line 9—9 in Fig. 8;

Fig. 10 is a vertical sectional view of a part of this mechanism taken at right angles to the showing in Fig. 8 and along the line 10—10 in Fig. 8;

Fig. 12 is a plan view of the loading station as taken substantially along the line 12—12 in Fig. 3;

Fig. 13 is an end view thereof as taken along the line 13—13 in Fig. 12;

Fig. 14 is a vertical sectional view thereof as taken along the line 14—14 in Figs. 12 and 13;

Fig. 15 is a more or less vertical sectional view therethrough as taken along the line 15—15 in Figs. 3 and 12;

Fig. 16 is a fragmentary plan view of the unloading mechanism as taken substantially along the line 16—16 in Fig. 11;

Fig. 17 is a vertical sectional view taken along the line 17—17 in Fig. 16;

Fig. 18 is a vertical sectional view as taken along the line 18—18 in Fig. 17;

Fig. 19 is a vertical sectional view as taken along the line 19—19 in Fig. 16;

Fig. 20 is a plan view of any of the first three checking stations;

Fig. 21 is a vertical sectional view therethrough as taken along the line 21—21 in Fig. 20;

Fig. 22 is a right angle vertical sectional view as taken along the line 22—22 in Fig. 21;

Fig. 23 is an enlarged fragmentary view of the gear engaging the master and forming an enlarged fragment of Fig. 20;

Fig. 24 is a plan view of station number 4;

Fig. 25 is a vertical sectional view therethrough as taken along the line 25—25 in Figs. 4 and 24;

Fig. 26 is a side view thereof with certain parts in section as taken substantially along the line 26—26 in Fig. 25;

Fig. 27 is a sectional view of a limit stop as taken along the line 27—27 in Fig. 24;

Figure 4:
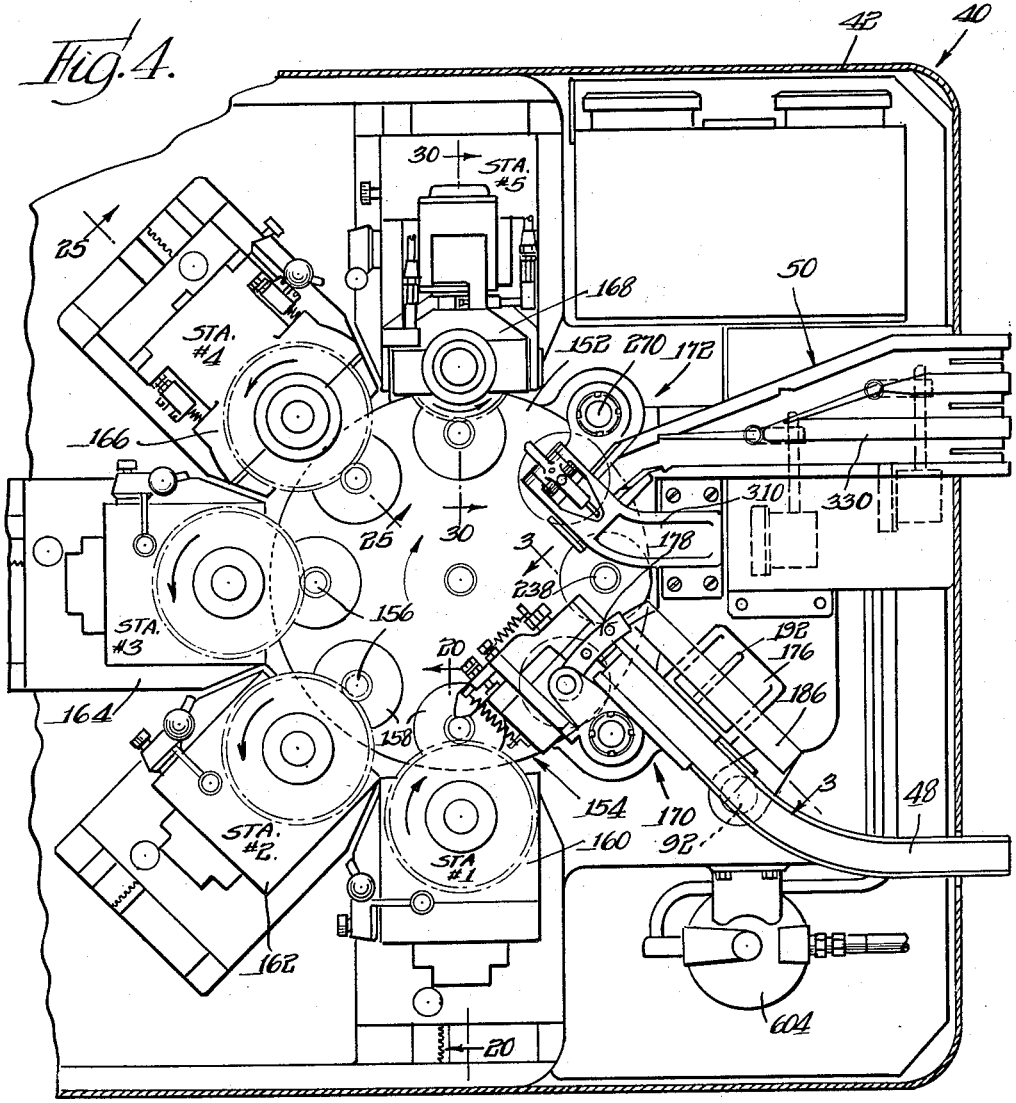
Fig. 4 is a top horizontal view of the operating parts of the machine with part of the case or housing being shown in section.
Figure 5:
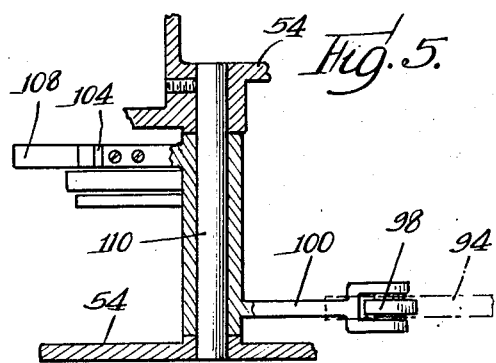
Fig. 5 is a vertical sectional view taken along the line 5—5 of Fig. 7 and showing one of the parts for controlling movement of the carrier.
Figure 6:
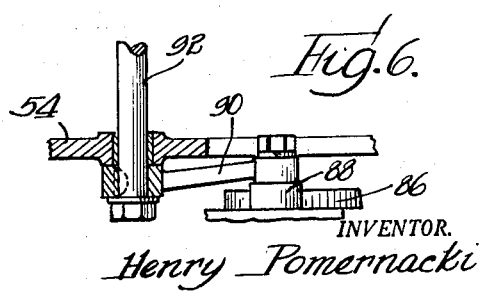
Fig. 6 is a vertical sectional view taken along the line 6—6 of Fig. 7 showing a part of the mechanism for controlling the loader.

Fig. 28 is a horizontal sectional view through the gear and checker at station number 4 as taken along the line 28—28 in Figs. 25 and 29;

Fig. 29 is a vertical sectional view through the gear and checker as taken substantially along the line 29—29 in Fig. 28;

Fig. 30 is a plan view of checking station number 5;

Fig. 31 is a vertical sectional view therethrough as taken along the line 31—31 in Fig. 30;

Fig. 32 is an enlarged view of the engagement of the gear with the checker or master as taken along the line 32—32 in Fig. 30; and Fig. 33 is an end view partially in section as taken along the line 33—33 in Fig. 31.

Referring now in greater particularity to the drawings, and first to Figs. 1 and 2, there will be seen a gear checking machine designated generally by the numeral 40 and comprising a case or housing 42 having a cover or hood 44 of metal and plastic. The plastic portion 46 of the hood conveniently can be transparent for observation of operation of the machine. An inlet chute 48 extends downwardly through the hood into the machine, while an outlet chute 50 extends downwardly and outwardly therefrom. Various electrical components 52 forming a part of a "memory" or control device are located on the front of the cabinet.

Figure 11:
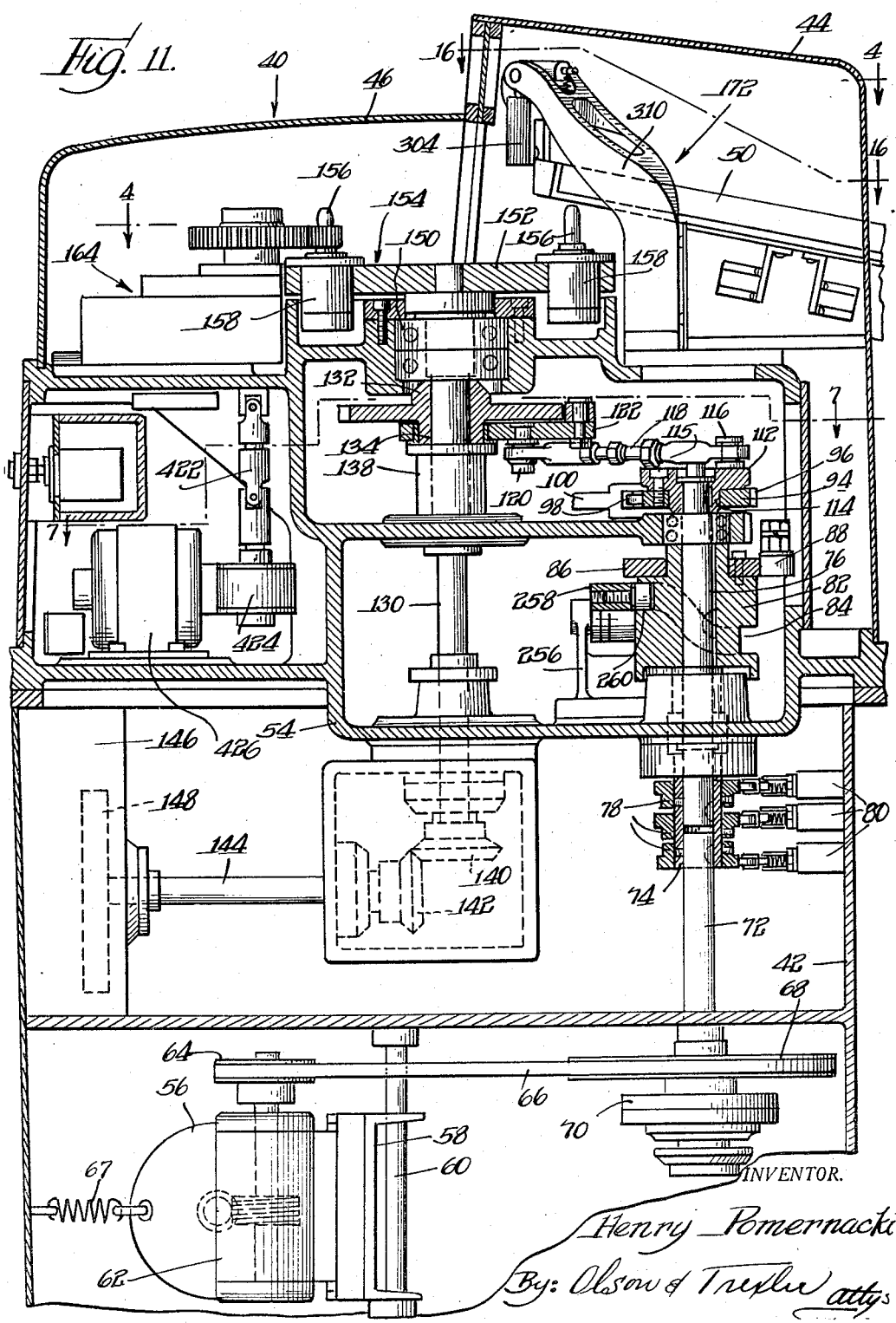
Fig. 11 is a vertical sectional view through the machine as taken substantially along the line 11—11 in Fig. 1.

The machine further includes a frame 54 (Figs. 3, 7 and 11) which in certain parts comprises parts of the housing 42. A motor 56 is pivotally mounted by means of a bracket 58 fitting on a vertical axle 60. The motor acts through a gear reducing mechanism 62 and a pulley 64 to drive a belt 66. A spring 67 stretched between the motor 46 and the housing maintains the belt 66 taut. The belt 66 drives a pulley 68 which preferably acts through a clutch mechanism 70 to drive a shaft 72 having a sleeve 74 fixed on the upper end thereof. This sleeve also is fixed to the lower end of a shaft 76, and cams 78 are mounted on the sleeve for controlling switch mechanisms 80. The shafts 72 and 76 function as a common shaft, but are made in two parts to facilitate assembling the machine. The shaft 76 is provided with a cylindrical cam 82 having a circumferential cam groove 84 for purposes hereinafter to be set forth.

A cam 86 is provided above the cylindrical cam 82, and a cam follower roller 88 on a lever 90 engages this cam. A rock shaft 92 is rocked by the lever 90 to control loading of the machine as will be brought out hereinafter.

Adjacent the upper end of the shaft 76 there is provided a cam 94 having a high spot 96 thereon. A cam roller 98 on a lever 100 engages this cam, a spring 102 being stretched between the lever 100 and the housing 42 to maintain the roller 98 in contact with the cam 96. The opposite end of the lever 100 has attached thereto a detent member 104 having a finger 106 locking a disc 108 against rotation. The arm or lever 100 is pivoted at 110 intermediate its ends.

A crank disc 112 is mounted at the upper end of the shaft 76, and a depending hub 114 on this disc serves as a seat for the cam 94. Bolts 115 extend down through arcuate slots in the disc 112 and are threaded into the cam 94 in order to provide for angular adjustment of the cam relative to the disc. The disc 112 is provided with a crank pin 116, and an adjustable connecting rod 118 on the crank pin is connected to a crank pin 120 on a pivoted arm 122. This arm in turn is provided with a pivotally mounted pawl 124 cooperable with notches 126 in the periphery of the disc 108 in order intermittently to operate the disc. A spring 128 is stretched between the pawl and a fixed pin on the arm 122 in order to maintain the pawl in engagement with the periphery of the disc.

It will be apparent that rotation of the shafts 72 and 76, and attendant rotation of the cam 94 and disc 112 will from time to time cause the pawl to be moved in a counterclockwise direction and then again in a clockwise direction (as viewed in Fig. 7) a distance equal to the distance between successive notches 126, and also will cause the detent mechanism finger 106 to be retracted so that the connecting rod 118 may pivot the arm 122 to cause the pawl to move the disc 108 stepwise a distance between adjacent notches.

The disc 108 is mounted on a vertical shaft 130, and has an upwardly extending boss 132 and a depending boss 134. Opposed set screws 136 extend through the upper boss 132 to fix the disc on the shaft, and the depending boss serves to journal the pivot arm 122. A spacer 138 is interposed between the depending boss and an intermediate frame portion properly to position the pivot arm 122 on the depending boss.

The lower end of the shaft 130 passes through a suitable bearing supported by a portion of the frame, and is provided with a bevel gear 140. This bevel gear meshes with a bevel gear 142 on a cross shaft 144 operating a control or "memory" mechanism 146 incorporating the electrical components 52 previously mentioned. The function of the control or "memory" device will be set forth hereinafter. Suitable devices are known in the prior art, and it therefore is deemed unnecessary to disclose a specific structure. It might be stated, however, that the control or "memory" device incorporates a control wheel 148 incrementally rotated by the shaft 144 and thereby effecting control of various circumferentially disposed switch mechanisms.

The shaft 130 is journaled near the upper end in suitable antifriction bearings 150, and a disc 152 forming a part of a turret 154 is mounted on the upper end of the shaft. The turret further includes a plurality of stub shafts or spindles 156 rotatably mounted in suitable bearing structures 158 at equally arcuately spaced locations about the periphery of the disc. In the illustrative embodiment of the invention there are eight such spindles and bearings spaced forty-five degrees apart.

Spaced arcuately about the turret 154 and in fixed position there is a plurality of testing stations, respectively labeled stations #1–5, and further idenfied by the numerals 160, 162, 164, 166 and 168 (Figs. 4 and 7). In addition, there is a loading station 170 and an unloading station 172. Intermediate the loading and unloading stations there is a blank space.

The loading station is shown in Figs. 3, 4 and 12–15 and includes the lower or terminal end of the loading or inlet chute 48. The inlet chute is provided at its lower end with a fixed stop 174, and the lower end of the chute is supported by a pedestal or bracket 176 supported on a part of the frame 54 of the machine. The chute further is provided with a movable stop 178 a short distance above the fixed stop, the movable stop comprising a flat plate mounted by means such as screws on top of an arm 180 extending generally transversely of the chute. The plate 178 and arm 180 both are of arcuate configuration, and the plate extends outwardly beyond the end of the arm as at 182. The arm 180 is mounted on the more or less horizontal shank 184 of an L-shaped bracket 186 having a depending leg 188. The leg 188 in turn is formed integral with a cross-arm 190 which is affixed to the upper end of the shaft 92. This shaft, and hence the arm 186 and stop 178 are periodically rocked back and forth by the cam 86.

An L-shaped stud 192 is threaded through the depending leg 188 of the lever 186 and has a jamb nut 194 adjacent the inner end thereof to lock it in position. The inner end 196 of the stud abuts the bracket 176 to limit the counterclockwise movement (as viewed from above) of the arm 186 and stop 178. A coil spring 198 is stretched between the depending end of the stud 192 and a spring anchor 200 threaded into the bracket 176 normally to urge the arm or lever 186 in a counterclockwise direction of rotation, and thereby to hold the cam follower roller 88 against the cam 86.

Finished gears 202 roll down the inlet chute 48 and are stopped by engagement with the movable stop 178, the rolling gears being shown in Fig. 3 and the stopped gear being shown in Figs. 12 and 13. A plate or fence 204 (Fig. 15) is provided on the counterclockwise limiting side of the chute 48 and below the projecting end 182 of the movable stop 178. The plate is mounted on a pivotal rod 206 which is more or less horizontal in position, the plate or fence 204 thereby being capable of being tipped in a clockwise direction as viewed in Fig. 15. A bracket or fixture 208 (Figs. 3, 12 and 13) is clamped on the outer end of the pivot rod or shaft 206. A helical spring 210 is stretched between a pin 212 on the fixture 208 and a fixed pin 214 carried by a bracket 216 supported in fixed position by the pedestal bracket 176. A fixed pin 218 (Fig. 13) carried from the bracket 176 serves as a stop for the fixture 208 limiting pivoting movement thereof under the influence of the spring 210. The fixture is shown in Figs. 12 and 13 as pivoted away from the pin, and in this position the fence or plate 204 is in horizontal position as shown by the dotted lines in Fig. 13. When the fixture 208 abuts the stop 218 the fence or plate is in the upright position shown in solid lines in Fig. 15.

When the movable stop 178 is retracted by rocking of the shaft 92, the lowermost gear 202 rolls against the fixed stop 174. Return movement of the movable stop 178 as effected by the spring 198 causes the projecting end 182 to engage the side of the gear 202 as in Fig. 15, and to tip the gear against the plate or fence 204, which pivots against the force of the spring 210 as a result. The gear thus is moved into horizontal position as shown in dashed lines in Fig. 15.

The horizontally tipped gear 202 is caught by a pair of pivoted jaws 220 supported by structure 222 secured to the chute 48 and to the part forming the fixed stop 174. It will be observed that the pivot rod or shaft 206 carrying the fence or plate 204 is journaled in the part 174. A spring 224 is stretched between pins 226 adjacent the lower portions of the jaws 220 to urge such lower portions toward one another. Pivoting about the mounting pins 228 is limited by stop portions 230 formed at the top corners of the jaws and engaging the structure 222. The jaws 220 support the gear 202 directly above and in alignment with one of the spindles 156 of the turret 154 with the turret in stopped position.

An L-shaped punch 232 is mounted above the jaws and is provided with a depending shank 234 having a central recess 236 therein. When this punch is moved down it forces the gear past the jaws 220 which spring outwardly against the force of the spring 224. The gear thus is forced down onto the spindle 156.

The transverse foot or leg of the punch 232 is mounted non-rotatably at the upper end of a vertically reciprocable connecting rod 238. Suitable mechanism for vertically reciprocating this rod in the required manner will be set forth shortly hereinafter.

When the turret is indexed one step by the mechanism described with regard to Fig. 7, the gear just carried from the jaws 220 onto the spindle 156 is brought to the first testing station. Description of that station will be held in abeyance for a short time, except that an initial test is performed at that station by a part associated with the inlet or loading mechanism. More specifically, a finger 240 (Figs. 12–14) is pivotally mounted on the part 174 and projects toward the first testing station. A spring 242 stretched between a pin 244 on the finger and a spring anchor 246 on the side of a switch mechanism 248 urges the finger toward the spindle 156 and toward the switch mechanism. This switch mechanism is secured to the structure 222 mounting the jaws 220. A stop 250 threaded through a raised part of the finger 240 is adjustable and engages one of the parts 222 to limit movement of the finger in this direction. A further raised part 252 receives a threaded stud 254 which engages the switch mechanism 248 to operate the same.

The finger 240 is pivotally mounted beneath the part 174, and is mounted at such a height that it will pass over a gear on one of the spindles 156 if the gear is all of the way down on the spindle. However, if the gear has a tight hole so that it does not move all of the way down on the spindle, the finger will engage the gear and will be moved outwardly to operate the switch member 248. This operates through the control circuit or mechanism or device 146 previously mentioned to condition the unloading mechanism for separating such a gear into a group of rejected but salvageable gears. Upon enlargement of the center hole, the gear can again be run through the machine for checking for other errors. It will be understood that if the gear were not so rejected, there would be no check on it since it would pass above all of the testing stations.

The mechanism for vertically reciprocating the connecting rod 238 to operate the punch of the gear loading mechanism is shown in Figs. 7–11 and includes a bracket 256 mounted on a part of the machine frame 54 and pivotally supporting a rocker arm 258 intermediate its ends. A cam roller 260 is mounted on the rocker arm 258 near one end thereof, and is received in the cam track 84 of the cam 82 mounted on the driving shaft. The cam track 84 normally maintains the end of the rocker arm carrying the roller 260 in the raised position shown in Fig. 8, and once each revolution of the cam lowers this end of the rocker arm. The end of the rocker arm in question rotatably carries a roller 262, and this roller engages beneath the bottom end of the connecting rod 238. A collar is placed on the connecting rod as at 264, and a spring 266 is compressed between this collar and a part of the machine frame 54 in order to hold the connecting rod 238 down against the roller 262.

Each time the cam track 84 and roller 260 effect lowering of the roller 262 the spring 266 tends to lower the connecting rod 238. This, in turn, causes the punch mechanism 232 to force the gear from the jaws down onto the waiting spindle 156. This spring lowering is a very desirable feature in that it prevents damage if a gear should by any chance jam in the jaws, or if the gear should have a tight hole and therefore not properly fit down over the spindle.

A roller 268 is rotatably mounted at the opposite end of the rocker arm 258 and bears beneath the lowermost end of a vertically reciprocable connecting rod 270 forming a part of the unloading or discharge mechanism as hereinafter will be set forth. The rod 270, like the rod 238, is mounted in suitable structure, such as sleeve bearings, in the frame 54 to permit up and down movement of the rod. A coil spring 272 is compressed between a part of the frame and a collar 274 on the rod 270 normally to hold the bottom end of the rod tightly down against the roller 268.

Each of the connecting rods 238 and 270 is provided with a vertical keyway 276, and a suitable keying member 278 having a tongue thereon projecting into the keyway is secured adjacent each of these rods to prevent rotation of the rods during their vertical reciprocation. It will be understood that rotation or pivoting of the rods cannot be tolerated since the parts which they carry must be aligned with other parts for proper operation of the machine.

The lower arm of the rocker arm 258 has a stud 280 adjustably threaded therethrough and locked by means of a jamb nut 282 (Fig. 10). The stud 280 engages the upstanding end 284 of a relatively small rocker arm 286 pivoted intermediate its ends at 288 on a bracket 290. The opposite upstanding end 292 of the small rocker arm is engaged by a spring mechanism 294 to hold that end of the small rocker arm down against the plunger 296 of a lubricating mechanism 298. A distributing oil line 300 leads from the lubricating mechanism 298 to several of the vertical bearings in the machine. Such connections are conventional, and accordingly are not shown specifically. Thus, each time the rocker arm 258 is rocked by the cam 82, the small rocker arm 286 also is rocked and causes the lubricating mechanism 298 to deliver oil or other lubricant to a plurality of the bearings of the machine.

After a gear has been carried incrementally through almost a complete revolution of the turret (270° in the illustrative embodiment), and has stopped and been checked at each of the testing stations #1—5 as will be set forth hereinafter, the gear comes to the unloading or discharge station 172. This station is shown in Figs. 4, 11 and 16–19. The unloading or discharge station comprises a bracket or fixture 302 mounted at the upper end of the vertically reciprocable connecting rod 270 by means such as a reduced end on the connecting rod and a nut threaded thereon. The fixture includes at its outer end a retractor 304 generally of inverted U-shape having a pair of depending legs or flanges 306 and a pair of inwardly directed shelves 308 at the lower edges thereof. The retractor 304 normally is positioned as shown in dashed lines in Fig. 18 so that one of the spindles 156 carrying a tested gear 202 moves between the flanges 306, the gear being positioned directly above the shelves 308. Upon vertically upward movement of the connecting rod 270 by virtue of the mechanism heretofore described, the gear is pulled upwardly off the spindle to the position shown in full lines in Fig. 18, and also shown in Figs. 11 and 17.

An upstanding twisted stand or bracket 310 is mounted on a part of the machine frame and pivotally supports at its upper end a more or less hook shaped pusher 312. The pusher is provided with a rounded nose 314 engageable with a gear 202 held by the retractor, and is pivoted away from such engagement by a spring 316 stretched between a pin 318 on the pusher and a pin 320. A stop 322 is threaded through the pusher 312 adjacent the pivot 324 thereof, and as the retractor 304 approaches its uppermost position it engages this stop, and thereby pivots the pusher 312 to push the gear 202 from the retractor as shown in Fig. 17.

A stop 325 extends across the bracket 310 near the top thereof to limit clockwise rotation (as viewed in Fig. 17) of the pusher 312 when the retractor 304 is in its normal lowered position. This maintains the stop or set screw 322 in proper position for engagement by the top of the retractor when the retractor rises.

When the retractor 304 rises and engages the stop 322 to pivot the pusher in a counterclockwise direction, as indicated heretofore, the gear 202 is pushed off of the shelves 308 and tips into the upper end of the discharge chute 50. The side wall of the discharge chute immediately adjacent the retractor is beveled as at 326 to insure final tipping of the gear into substantially upright position, the bottom of the chute being slightly inclined from side to side to insure that the gear will not rest against the beveled wall 326. The gear substantially immediately starts to roll gravitationally down the chute 50, and passes through a curved portion 328 thereof into a switching section generally designated 330.

In the switching section the chute 50 branches into three branch paths for acceptable gears, rejected gears, and rejected but salvageable gears. These tracks respectively are numbered 332, 334 and 336 in Fig. 16. The "accepted" chute track 332 normally is open. The "rejected" track 334 normally is closed by a gate 338, while the "rejected" but salvageable track 336 normally is closed by a gate 341. The gate 338 normally is held in the position to close the track 334 by a spring 340, and the gate is opened to open the track 334, and simultaneously to close the track 332, by a solenoid mechanism generally indicated by the numeral 342. Similarly, a spring 344 normally holds the gate 341 in position to close off the track 336, and a solenoid mechanism 346 opposed this spring to shift the gate into position to open the track 336, simultaneously closing off both tracks 332 and 334.

The two gate operating mechanisms are identical, and accordingly only that associated with the gate 338 will be described in detail. The gate is fixed on a pivot shaft 348 perpendicular to the floor of the track. The pivot shaft is rotatably mounted in a post 350 set in the underside of the junction between the tracks 332 and 334. An arm 352 is fixed to the bottom end of the pivot shaft 348 and forms an obtuse angle with the gate 338. A pin 354 is fixed in the end of the arm 352, and the spring 340 is stretched between this pin and a fixed pin 356.

The solenoid 342 is of conventional construction and includes a plunger 358. The plunger is pivotally connected at its outer end to a connecting rod 360, and the connecting rod is provided at its outer end with a longitudinally elongated slot 361 in which the pin 354 is received. A spring 362 is stretched between the pin 354 and an anchor 364 on the connecting rod 360. The spring 362 is stronger than the spring 340 so that the pin 354 normally is held against the end of the slot 361 toward the plunger 358. Accordingly, if the solenoid 342 should tend to swing the gate 338 from the position shown in Fig. 16 to a position opening the track 334 and closing off the track 332, and a gear should be caught behind the gate, no parts would be broken and the solenoid would not be burned out. Rather, the spring 362 would stretch and the pin 354 would move toward the other end of the slot 361.

It will be understood that the nature of the control or memory device 146 is such that the chute gates 338 and 341 are controlled thereby. Normally, the gates are positioned to leave the "accepted" track 332 open. If a gear should be found unsatisfactory at any of the testing stations #1–5, then the control device would function at the time the gear is removed from the turret to swing the gate 338 to cause the gear 202 to roll down the "rejected" track 334. Similarly, if the gear should be found to be unsatisfactory, but salvageable, such as by having a tight hole or by having nicks therein, then the control device would cause the gate 341 to close off the "accepted" track 332 and the "rejected" track 334, while opening the "rejected but salvageable" track 336.

In accordance with another feature of the invention, a control mechanism 365 (Fig. 16) is provided for either providing a visual indication when too many gears are rejected, or preferably for controlling a relay to stop the machine supplying gears to the testing apparatus. More specifically, the mechanism 365 is a counter-type control of a type known in the art which is operable to stop the supplying machine, such as a gear shaving machine, for adjustment if more than a certain, but adjustable, number of gears is rejected in succession, or if the percentage of rejections is too high.

The mechanism 365 includes a control panel 367 in which is mounted an adjustable and automatically resetable counting or stepping relay 369. In order to count the rejected gears, the relay 369 is connected to a switch 371 through a cable 373. A pivotally mounted lever 375 extends through the floor of the track 334 so that the lever is depressed and the switch is closed each time a gear passes down the track, the relay 369, thereby being energized.

The relay 369 also is connected by means of cables 377 and 379 to switches 381 in the "accepted" track 332, and 383 in the "rejected but salvageable" track 336 and controlled by respective levers. Thus, each time a gear passes down either of the tracks 334 and 336 the relay 369 moves ahead one step, and each time an acceptable gear passes down the track 332 the relay is reset. However, if a predetermined number of gears is rejected in succession, the relay 369 actuates a circuit including cable 385 to stop the supplying machine.

The panel 367 also includes counting relays 387 and 389 of known commercial construction, and similar to the relay 369. The relays 387 and 389 are electrically connected with each other and with the switches 371, 381, and 383 so that they function to energize the circuit including the cable 385 to stop the gear supplying machine whenever a certain percentage of a given number of gears is rejected. The relays 387 and 389 are adjustable, like the relay 369, and the relay 387, for example, may be used to determine the permissible number of rejects for a certain quantity or range of gears, while the relay 389 may be used adjustably to set the range.

Shut off control mechanism alternatively could be provided at any or all of the five testing stations, and visual indicating means could be provided instead of shutting off the supplying machine.

The first three checking or testing stations are shown in Figs. 20–23. The stations are located adjacent the periphery of the turret as previously has been noted with regard to Fig. 4, and the first three stations, stations 160, 162, and 164, are substantially identical. The difference is that a conventional helical master gear is used in stations 1 and 2, the direction of rotation being relatively opposite at these two stations in order to check both faces of the teeth of the gears being tested, while station number 3 employs a special testing gear as will be set forth hereinafter.

Each of stations #1–3, specifically station 164, comprises a bed 366 suitably anchored to a portion of the machine frame. A base plate 368 is mounted by means of a dove tail 370 on the bed for adjustment toward and away from the turret. A rack and gear mechanism 372 is provided for making the initial adjustment whenever a new master gear is installed. A gib 374 and locking screw 376 therefor are applied to insure a tight fit at all times in the dove tail, and to help in effecting locking thereof. Bearing blocks 378 are secured to the top of the base plate 368 by means such as screws or bolts 380, and these bearing blocks are provided with straight bearings or ball receiving grooves 382 having bearing balls 390 received therein.

A slide block 392 is slidably mounted on top of the base plate 368 by having the balls 390 received in grooves 394 in the undersurface thereof. A pivoted hand lever 396 is provided for manual retraction of the slide block 392 and a locking mechanism 398 is provided for locking the slide block in retracted position. This would be done for installing a new master gear or otherwise setting up the machine.

The handle 396 is shown as pivoted at 400 on the side of one of the bearing blocks 378, and as having a pair of eccentric pins 402 and 404. The pin 402 may be received in a vertical slot in the slide block 392 so that rotation of the handle 396 about the pivot 400 will effect sliding movement of the slide block. The pin 404 may be received in an arcuate slot in the adjacent slide block 378 to determine the permissive degree of movement of the handle 396.

A more or less Z-shaped bracket 406 is bolted beneath the base plate 368 as may be seen in Fig. 21, and a channel shaped spring anchor 408 is adjustably held thereon by means of a bolt and slot connection 410. A pair of coil springs 412 is stretched between the spring anchor 408 and an angle bracket forming a spring anchor 414 on the slide block 392. The spring tension is mainly vertically downwardly on the slide block so as to hold the slide block down tight against the bearing balls 390. However, the springs are arranged somewhat at an angle to the vertical so as to have a horizontal force component urging the slide block 392 toward the turret 154 with a fairly substantial force, say on the order of twenty pounds.

The slide block 392 mounts a housing 416 having a vertical shaft 418 journaled therein by means such as ball bearings 420 near the top and bottom of the shaft, suitable lubricant seals being provided, and the lubricating device 298 being connected thereto if desired.

The shaft 418 is connected by means of a universal joint 422 (Figs. 11, 21 and 22) to the output of a gear reducer 424 driven by an electric motor 426 suitably mounted on a part of the machine frame 54. The universal joint connection allows for sliding movement of the slide block radially of the turret.

A velocity pickup 428 is provided coacting between the slide block 392 and the base plate 368. Such pickups are well known in the art, and in the present instance the pickup comprises a horseshoe magnet 430 having the ends thereof juxtaposed to the cores of a pair of generating elements 432 having windings therein. As will be understood by those skilled in the art, movement of the magnet 430 in the vicinity of the cores of the detecting elements 432 causes electrical currents to be induced in the coils of the detecting elements at a magnitude determined by the extent and speed of movement of the magnet 430. Since the magnet 430 is carried by the slide block and the detecting elements by the base plate, the currents or voltages developed by the detecting elements will be proportional to the speed and extent of movement of the slide block relative to the base plate. The wires 433 of the detecting elements are connected to the memory or control device 146 as will be apparent, so that excessive speed or distance of movement will cause rejection of the gear causing such movement.

A master gear 34 is detachably secured at the upper end of the shaft 418 by means such as a nut 436. The gear does not necessarily have to be keyed to the shaft since friction caused by the nut will be enough to supply all of the rotating force that is necessary to rotate the gear 202 being checked, and this gear is idling.

The checking or testing gears at stations #1 and #2 are conventional helical master gears. The master at station #1 rotates in a clockwise direction, while at station #2 the master rotates in a counterclockwise direction. Thus, the faces on both sides of the gear teeth of the gear 202 are checked for run-out, tooth to tooth spacing, and nicks. At station #3 the gear is tested for maximum lead, and for angular velocity by a special master gear. As will be seen particularly with reference to Fig. 23, the teeth 438 of the gear 434 have the tips pointed as at 440 to facilitate indexing with the gear 202 being checked. Beyond the line 442 the teeth are tapered short of the involute so that the tips 440 have no engagement with a gear 202. The work piece engaging surfaces 444 which remain preferably are so formed that their faces engage the gear 202 at pitch line 445 near the outside diameter of the gear. This allows the master gear to check the helix by a tooth-to-tooth reading and to check the run-out of the gear under test near the outside diameter. Any excess run-out at this point over and above the regular run-out reading is caused by the work gear having angular velocity errors similar to those of run-out. The two types of errors are similar in that they have eccentric pitch diameters, but the angular velocity errors have a varying tooth thickness that the standard roll master will not detect.

The gear testing mechanism 166 at station #4 is quite similar to that shown and described with regard to the first three stations, but has significant differences relative thereto. More specifically, and as may be seen with regard to Figs. 24–29, the testing mechanism 166 comprises a bed 446 mounted on the frame of the machine, and having a base 448 adjustably mounted thereon by means of a dovetail joint 450. A gib 452 and adjustment screw or lock 454 therefor are provided in the dovetail, and a rack and pinion mechanism 455 is provided for initial setting of the base relative to the bed. A lower slide plate 456 is movably mounted on the base by means of a bearing block 458 and a plurality of bearing balls 460 rollingly mounted in grooves between the bearing block and the lower slide plate. A generally Z-shaped bracket 462 is provided beneath the base 448 and adjustably carries a spring anchor 464. A pair of coil springs 466 is stretched between this spring anchor and an angle bracket spring anchor 468 on the underside of the lower slide plate. The springs are generally vertical, but are inclined slightly from the vertical so as to provide both a vertical hold down force, and a horizontal biasing force.

A handle 470 and associated parts similar to those previously described are provided for retracting the lower slide against the force of the springs 466 for installing a new master gear or otherwise setting up the machine.

An upper testing mount 472 is spaced slightly above the lower slide plate 456 by pairs of flexible or resilient straps 474 secured to the mount 472 and lower slide plate 456. Thus, the lower slide plate 456 is movable relative to the base toward and from the turret radially thereof, and the upper movable gear mount 472 is similarly movable relative both to the lower slide plate and to the base.

The movable mount 472 is recessed on opposite sides as at 476. A column 478 extends upwardly from the lower slide plate 456 within each of the recesses 476, and bolts 480 projecting into each recess toward the column 478 from each side thereof provide stops limiting relative movement between the movable upper gear mount 472 and the lower slide plate 456. A coil spring 482 on each side is compressed to urge the movable upper gear mount inwardly relative to the lower slide plate in a direction radially of the turret 154.

A velocity pickup 484 is provided to ascertain the movement of the upper movable mount 472 relative to the lower slide plate 456. More specifically, the velocity pickup includes a horseshoe magnet 486 carried by the upper movable mount, and a pair of detecting elements 488 carried by the lower slide plate and comprising coils wound on iron cores. The detecting elements are connected by wires 490 to the control or memory device 146 for effecting proper control of the gates 338 and 341 in accordance with whether the gear should be accepted, rejected, or passed into the group of rejected but salvageable gears.

A depending gear housing 492 is carried by the lower slide plate and mounts a hollow shaft 494 by means of suitable antifriction bearings 496. Suitable oil seals and lubricating means are provided, and such lubricating means may be supplied from the lubricating device 298. A universal joint 498 connects the hollow shaft 494 with the output shaft 500 (Fig. 7) of a speed reducer 502 driven by an electric motor 504.

An upstanding gear housing 506 is carried by the upper movable gear support, and the drive shaft 508 is rotatably carried thereby, being journaled in suitable antifriction bearings 510. Suitable lubricant seals and lubricating means again are provided.

At station #4, rather than there being a single testing or checking gear, there is a checking gear assembly designated generally by the numeral 512 (Figs. 24, 25, 28 and 29). This gear assembly comprises a rather thin gear 514 mounted at the top of the shaft 494 by a wide head screw or bolt 516. This thin or flat gear meshes with the gear 202 to be tested near the bottom thereof. A similar flat gear 518 is mounted at the bottom of the shaft 508 by means such as a stud 520 extending through the shaft and having a flat nut 522 threaded on the end thereof. Being on different shafts, the gears 514 and 518 are generally independently movable. However, a pin 524 is fixed in the gear 518 and extends downwardly relative thereto and is received loosely in an aperture 526 in the lower gear 514. The pin 524 allows a limited amount of movement of the two checking gears 514 and 518 relative to one another, but insures synchronous operation and substantially constant phase relation of the gears to simplify meshing thereof with the gear 202 to be tested.

The gear 514 drives the gear 202 which is being tested, and this gear in turn drives the testing gear 518. Since the gear 202 is a helical gear, the flat testing gears 514 and 518 are offset relative to one another. Any variation in lead such as brought about by wobble therefore will cause relative shifting of the two testing gears 514 and 518, and as a result a voltage will be induced in the detecting devices 488. This voltage will be transferred to the control or memory device 146 by the wires 490, and if the lead variations are beyond a predetermined maximum the control or memory device will at the proper time effect control of the gates 338 and 341 to cause the gear to pass into the proper group.

After the gear 202 has been checked at station #4, it is carried by the turret 154 to station #5 for checking.

The mechanism of the final testing or checking station, namely station #5, is shown in Figs. 30-33. This mechanism 168 partakes of many of the physical features of the mechanisms at the prior testing stations, but also possesses significant differences as hereinafter will be set forth.

The mechanism includes a bed 528 having a base 530 dovetailed thereon. A gib 532 and clamping or locking screw 534 again are provided for the dovetail. A bearing block 536 is fixed on top of the base and is provided with grooves receiving bearing balls 538. A slide 540 is mounted on top of the balls, having suitable grooves in its undersurface to receive the balls. As heretofore, there is provided a Z-shaped bracket 542 on the bottom of the base and having an adjustably mounted channel shaped spring anchor 544 on the bottom thereof. A pair of springs 546 is stretched between the spring anchor and an angle bracket spring anchor 548 on the underside of the slide 540.

A bearing housing 550 is mounted on top of the slide, and an axle 552 is rotatably mounted therein by means of a pair of ball or other antifriction bearings 554 at opposite ends of the axle and housing. A yoke 556 is secured to the end of the axle 552 and is provided at its outer end with inwardly projecting stub shafts 558. A cylinder 560 is mounted for rotation on these stub shafts by means of suitable antifriction bearings 562.

A bearing housing 564 is provided upstanding from the cylinder 560, and a shaft 566 is journaled therein by means such as ball bearings 568. The testing gear 570 is secured on this shaft and is driven from below by means of a universal joint connection 572 on a drive shaft 574, the latter in turn being driven by a gear reducer 576 (Fig. 7) associated with an electric motor 578.

A handle 580 and associated mechanism again are provided for retracting the slide against the force of the springs 546 for installing a new testing gear 570, or for otherwise setting up the machine. The rotating or pivoting support of the cylinder 552 on the slide, and the rotating or pivoting support of the cylinder 560 from the yoke 556 on the cylinder 552 provide a gimbal suspension for the testing gear 570.

The testing gear 570 as may be seen in Figs. 31 and 32 is provided with a circumferential slot 582 so that the gear has axially spaced teeth 584 of rather short axial extent engaging the teeth of the gear 202 substantially at the opposite axial limits thereof. This type of tooth engagement effects a universal movement of the testing gear 570 for ascertaining average lead and average taper.

A pair of pneumatic detectors is provided for measuring the universal movement of the testing gear 570 due to its reaction with the gear 202 to be tested. A clamping supporting fixture 586 is provided on top of the housing 550 and supports a device 588 having an orifice therein, and connected with an airline 590. A pin 592 is carried by an upstanding part 594 on the yoke 556 and determines the amount of air passing through the orifice. The amount of air passing through the orifice determines the pressure drop across the orifice, and suitable connections are made to the control or memory device 146, as will be understood. The second detecting device is quite similar and includes a clamping device 596 on the yoke and supporting a device 598 having an orifice therein. This device is connected to a second air line 600, and the air passing through the orifice is controlled by a pin 602 carried by the cylinder 560. The two detecting devices between them thus detect movement at right angles to one another, and hence detect the universal movement of the testing gear 570. An air filter 604 (Fig. 4) is provided for filtering the air passing through the air lines 590 and 600 to prevent the carrying of any particles through these lines that might jam the orifices.

*Summary of operation*

Helical gears to be tested are rolled down the inlet chute 48 (Figs. 2, 3, 4, and 12) from a gear fabricating machine, or from a storage bin or hopper. The gears are stopped at the bottom by engagement with the movable stop 178, and several gears may be allowed to stack up in the inlet or delivery chute inasmuch as the helical configuration of the gears 202 makes it impossible for the teeth of successive gears to interlock. Pivoting of the arm 186 as effected by the cam 86 (Figs. 7 and 11) bearing on the cam follower 88 and acting through the rock shaft 92 effects retraction of the movable stop 178. Return movement of the movable stop under the influence of the spring 198 tips the gear 202 over the fence 204 (Fig. 15) into the jaws 220 (Figs. 12 and 14). The turret 154 is stopped with one of the spindles 156 aligned with the jaws, and downward movement of the counterbored punch 232 as caused by the vertical reciprocation of the connecting rod 238 under the influence of the spring 266 (Fig. 8) upon rocking of the rocker arm 258 by the cam 82 causes the gear 202 to be punched past the jaws onto the spindle 156.

Stepwise movement of the turret as effected by the pawl 124 (Fig. 7) acting on the disc 108 under the influence of the crank pin 116 driven by the drive shaft 76 (Fig. 11) moves the gear from the receiving or loading station to testing station #1. It will be understood that another gear 202 is loaded on the succeeding spindle 156 after each stepwise movement of the turret, but it is thought that this now will be obvious and need not be explained each time. The gear 202 in question and previously loaded is checked at the first testing station by the finger 240 (Fig. 12) to make sure a gear is all of the way down on the spindle. A further check is made by the helical master gear rotating in a clockwise direction. Another stepwise movement of the turret carries the gear 202 into engagement with the master gear of station #2 which is rotating in a counterclockwise direction. Stations #1 and #2 together check opposite sides of the teeth for runout, tooth to tooth spacing, and nicks.

A further stepwise movement of the turret carries the gear in question to station #3 where it is engaged by the testing gear 434 (Figs. 20–23) having the modified teeth with removed or chopped addendum and undercut dedendum. At this station the gear is checked for maximum lead and for errors in angular velocity.

A further stepwise movement of the turret carries the gear being tested to station #4 where the gear is tested by the gear assembly 512 comprising the two more or less independently mounted shallow or flat gears 512 and 514. Independent movement of the two testing gears is possible in this case within certain limits, and the gear being tested is checked for lead variation.

A further increment of movement of the turret carries the gear to station #5. The gimbal support of the testing gear at that station effects tipping or pivoting of the testing gear radially of the turret to check taper of the gear being tested, and also allows tipping or pivoting of the testing gear tangentially of the turret to effect checking of the average lead.

Yet another incremental or stepwise movement of the turret carries the gear being tested to the unloading or discharge station 172. The retractor 304 (Figs. 17 and 18) is at this time lowered so that the gear passes between the depending flanges or walls 306 thereon, and is picked up off of the spindle 156 by the shelves 308 as the retractor is raised. The necessary vertical movement of the retractor is effected by the connecting rod 270 as will be recalled, under the influence of the rocker arm 258 and spring 272. As the retractor 304 approaches its topmost position, it engages the set screw 322 and pivots the pusher 312 to tip the gear 202 from the retractor into the discharge or unloading chute 50 for gravitational rolling from the machine.

Normally the gate 341 (Fig. 16) is pivoted to close off the track 336, and the gate 338 is pivoted to close off the track 334. Thus, acceptable gears roll down the branch track 332. Each of the various pickups or detecting elements as heretofore referred to condition the memory or control circuit or device 146 to effect proper control of the gates when the gear failing to meet any of the tests is unloaded from the turret. Thus, if the gear is rejected but salvageable, such as by virtue of a tight hole or nicks, the gate 341 is swung to close off the tracks 332 and 334, while opening the track 336. On the other hand, if the gear fails any of the other tests the gate 338 is swung to close off the track 332 and to open the track 334, the gate 341 being in its normal position closing the track 336.

It will be apparent that there has herein been shown and described a gear testing machine which is capable of testing gears at a rapid rate, which tests the gears for a great many possible errors, and which is entirely automatic in operation. No manual effort is necessary to load or unload the machine, and it is quite unnecessary for an operator to stand by during operation of the machine.

The planetary arrangement of the gears being tested allows substantially simultaneous testing of a large number of gears in a relatively small space.

The specific embodiment of the invention as herein shown and described is to be understood as being for illustrative purposes only. Various changes in structure will no doubt occur to those skilled in the art, and are to be understood as forming a part of the invention insofar as they fall within the spirit and scope of the appended claims.

The invention is claimed as follows:

1. A gear testing machine, comprising, a base, a carrier on said base having support means thereon for carrying gears with their axes in substantially vertical position, means for rolling gears to be tested into said machine with their axes substantially horizontal, a movable stop carried from said base and engaged by the gears rolling into the machine, means for retracting and advancing said movable stop to urge gears one by one in an axial direction, additional stop means carried from said base and engaged by a gear upon retraction of said movable stop, means carried from said base over which said gears are tipped by such axial movement thereof to bring the gear axes from substantially horizontal to substantially vertical, the gears after such tipping being received by the support means of said carrier, gear testing means adjacent said carrier and having testing element means engageable with gears carried by said carrier, means for moving said carrier relative to said base to move gears on said support means into test position adjacent said testing element means, means for discharging tested gears from said machine, means carried from said base for automatically transferring tested gears from said carrier to said discharging means, and means for operating the movable stop, the carrier support means, and the transfer means in proper time relation.

2. A gear testing machine, comprising, a base, a carrier having support means thereon for supporting a gear with its axis in substantially vertical position, means for rolling gears into said machine with the gear axes substantially horizontal, gear retaining means supported from said base above said carrier and adapted to retain a gear with its axis in substantially vertical position, means supported from said base and operatively associated with said rolling means for tipping gears in succession from said rolling means into said retaining means to move the axes of the gears from substantially horizontal to substantially vertical, means movable relative to said base for forcing a gear axially from said retaining means to the support means of said carrier, gear testing means adjacent said carrier and having testing element means engageable with gears carried by said carrier, means for moving said carrier relative to said base to position said support means adjacent said testing element means for testing of a gear on said support means, means for discharging tested gears from said machine, and means for automatically transferring tested gears from said carrier to said discharging means.

3. A gear testing machine, comprising, a base, a carrier on said base having a plurality of substantially vertical spindles thereon for supporting gears to be tested with their axes in vertical position, means for rolling gears to be tested into said machine with the gear axes substantially horizontal, gear retaining means on said base adjacent said rolling means and positioned above said carrier and vertically aligned with each of said spindles from time to time, means on said base for intermittently moving said carrier to stop said carrier with a spindle aligned with said retaining means, means on said base for shifting gears successively from said rolling means to said retaining means and simultaneously changing their axes from substantially horizontal to substantially vertical, means on said base for successively pushing the gears from the retaining means onto the spindles successively aligned therewith, gear testing means on said base adjacent said carrier and past which gears on said spindles are fed by a movement of said carrier, said spindles successively being positioned a predetermined distance from said gear testing means as said carrier is stopped with a spindle aligned with said retaining means, said gear testing means having testing element means engageable with gears carried on the spindles, means for discharging tested gears from said machine, means for automatically transferring tested gears in succession from said spindles to said discharging means, and means for operating said carrier moving means, said gear shifting means, said gear pushing means, and said transferring means in proper time relation.

4. A gear testing machine, comprising, a base, a carrier thereon having a vertical spindle thereon for supporting a gear with its axis substantially vertical, means on said base for placing a gear on said spindle, gear testing means on said base adjacent said carrier and having testing element means engageable with gears carried by said carrier, means on said base for lifting a tested gear axially from said spindle, means on said base for turning the gear to move the axis thereof from substantially vertical to substantially horizontal, means adjacent said turning means for rolling the tested gear from the machine with the axis thereof substantially horizontal, and means for operating said carrier, said placing means, said lifting means, and said turning means in proper time relation.

5. A gear testing machine, comprising, a base, a carrier thereon having a substantially vertical spindle thereon for carrying a gear with its axis substantially vertical, means on said base for placing a gear on said spindle, gear testing means on said base adjacent said carrier and having testing element means engageable with gears carried by said carrier, extracting means on said base having confronting spaced apart lifting portions thereon, said carrier being movable relative to said base to carry a gear on said spindle past said gear testing means and adjacent said extracting means and above the opposed, spaced lifting means, means on said base for raising the extracting means for lifting the gear from the spindle, means on said base for removing the gear from the extracting means, and means for operating said carrier, said placing means, said extracting means, and said removing means in proper time relation.

6. A gear testing machine as set forth in claim 5 wherein the means for moving the gear from the extracting means comprises a lever engaging a fixed stop upon raising of the extracting means to pivot said lever whereby the lever engages the gear to move it from the extracting means.

7. Gear handling means, comprising, means for rolling a gear on its periphery along a predetermined path, gear retaining means positioned laterally of said path, stop means along said path for arresting a gear opposite said retaining means, a reciprocating member for pushing a gear laterally from said path to said retaining means, an obstruction intermediate said path and said retaining means and over which a gear is tipped when pushed by said reciprocating member to shift the gear axis from substantially horizontal to substantially vertical, a gear carrier positioned beneath said retaining means, means for moving a gear axially from said retaining means to said carrier, and means for operating said reciprocating member and said moving means in proper time relation.

8. Gear handling means as set forth in claim 7 wherein the obstruction over which the gear is tipped comprises a fence tiltable from substantially vertical to substantially horizontal position about a generally horizontal axis of the fence along the bottom of the fence.

9. Gear handling means as set forth in claim 7 wherein the retaining means comprises a spring retainer, and the means for moving the gear axially from the retaining means to the carrier comprises means for pushing the gear from the spring retaining means.

10. Gear handling mechanism, comprising, a carrier having a substantially vertical spindle thereon on which a gear is carried with its axis substantially vertical, and gear lifting means into which the gear is fed by movement of the carrier radially of the spindle and of the gear, means for raising the gear lifting means to lift the gear from the spindle, means for moving the gear from the lifting means and simultaneously shifting the gear axis from substantially vertical to substantially horizontal, and means for thereafter rolling the gear away from the lifting means with the gear axis substantially horizontal.

11. Gear handling mechanism as set forth in claim 10 wherein the lifting means comprises a generally channel shaped member oriented downwardly and having a pair of inwardly directed, confronting, spaced apart flanges for fitting beneath a gear to lift the same.

12. Gear handling mechanism as set forth in claim 11 wherein the means for moving the gear from the lifting means comprises a lever pivotally mounted thereon and engageable with a fixed stop upon raising of the lifting means whereby to move the lever into engagement with the gear to push the gear from the lifting means.

13. An automatic gear testing machine comprising, in combination, a base, a carrier mounted on said base for movement through a continuous path, a continuous series of gear support spindles rotatably mounted on said carrier in evenly spaced relation to each other, a series of gear testing assemblies mounted on said base in spaced relationship to each other along said carrier path which corresponds to the spacing of said spindles, means for indexing said carrier along said path to move said spindles into alignment with successive gear testing assemblies of said series thereof, gear loading means and gear unloading means mounted on said base at opposite ends of said series of testing assemblies for alignment with successive spindles of said series thereof upon indexing said carrier, said loading means including means for loading a succession of gears onto successive spindles indexed into alignment therewith, one of said testing assemblies including a rotary testing gear element positioned for meshing with a gear on an adjacent spindle and mounted for radial movement by the reaction thereon of a coacting spindle supported gear and including detector means for sensing radial movement of said testing gear element, another of said testing assemblies including a pair of rotary testing gear elements positioned to mesh with a gear on an adjacent spindle and mounted for radial movement with respect to each other by the reaction of a coacting spindle supported gear and including detector means for sensing relative radial movement of the two testing gear elements, another of said testing assemblies including a tandem testing gear element positioned for meshing with a gear on an adjacent spindle and mounted for rocking movement by the reaction of the coacting gear and including means for sensing rocking movement of the tandem gear element, means for rotating said respective testing gear elements and spindle supported gears meshing therewith; and means for synchronizing operation of said indexing means, said loading means, said unloading means, and said gear testing assemblies.

14. An automatic gear testing machine comprising, in combination, a base, a rotary carrier mounted on said base, an evenly spaced series of gear support spindles mounted on said carrier, a series of gear testing assemblies mounted on said base and having a spaced relation to each other around said carrier which corresponds to the spacing of said spindles, means for indexing said carrier rotatably to move said spindles into alignment with successive gear testing assemblies of said series thereof, gear loading means and gear unloading means mounted on said base at opposite ends of said series of testing assemblies for alignment with successive spindles of said series thereof upon indexing said carrier, said loading means including means for loading a succession of gears onto successive spindles indexed into alignment therewith, said unloading means including means for removing gears from successive spindles indexed into alignment therewith, each of said testing assemblies including a rotary testing gear element positioned for meshing with a gear on an adjacent spindle and mounted for displacement by the reaction thereof of a coacting spindle supported gear and including detector means for sensing displacements of said testing gear element, means for rotating the testing gear elements and spindle supported gears meshing therewith; and means for synchronizing operation of said indexing means, said loading means, said unloading means, and said gear testing assemblies.

15. An automatic gear testing machine comprising, in combination, a base, a carrier mounted on said base for movement through a continuous path, a continuous series of gear support spindles mounted on said carrier in evenly spaced relation to each other, a series of gear testing assemblies mounted on said base in a spaced relationship to each other along said carrier path which corresponds to the spacing of said spindles, means for indexing said carrier along said path to move said spindles into alignment with successive gear testing assemblies of said series thereof, gear loading means and gear unloading means mounted on said base at opposite ends of said series of testing assemblies for alignment with successive spindles of said series upon indexing said carrier, said loading means including means for loading a succession of gears onto successive spindles moved into alignment therewith, said unloading means including means for removing gears from successive spindles moved into alignment therewith, each of said testing assemblies including a gear contacting element positioned for engagement with a gear on a spindle indexed into alignment therewith, means on each testing assembly mounting the gear contacting element thereof for displacement along a predetermined path by the reaction thereof of a coacting spindle supported gear, the gear contacting element of at least one of said assembly stations being formed by a rotary testing gear element adapted to mesh with an adjacent spindle supported gear, means for rotating said testing gear element and the spindle supported gear meshing therewith, detector means on each gear testing assembly for sensing displacements of said gear contacting thereof; and means for synchronizing operation of said indexing means, said loading means, and said unloading means.

16. An automatic gear testing machine comprising, in combination, a base, a rotary carrier mounted on said base, an evenly spaced annular series of gear support spindles rotatably mounted on said carrier, a series of gear testing assemblies mounted on said base in a spaced relationship to each other around said carrier which corresponds to the spacing of said spindles, means for indexing said carrier to move said spindles into alignment with successive gear testing assemblies of said series thereof, gear loading means and gear unloading means mounted on said base at opposite ends of said series of testing assemblies for alignment with successive spindles of said series thereof upon indexing said carrier, said loading means including means for loading a succession of gears onto successive spindles indexed into alignment therewith, said unloading means including means for removing gears from successive spindles indexed into alignment therewith, one of said testing assemblies including a rotary testing gear element positioned for meshing with a gear on an adjacent spindle and mounted for displacement along a predetermined path by the reaction thereon of a coacting spindle supported gear and including detector means for sensing displacement of said testing gear element, another of said testing assemblies including a pair of rotary testing gear elements positioned to mesh with a gear on an adjacent spindle and mounted for displacement with respect to each other by the reaction of a coacting spindle supported gear and including detector means for sensing relative displacement of the two testing elements, means for rotating said respective testing gear elements and spindle supported gears meshing therewith, and means for synchronizing operation of said indexing means, said loading means, said unloading means, and said gear testing assemblies.

17. An automatic gear testing machine comprising, in combination, a base, a carrier mounted on said base for movement through a continuous path, a continuous series of gear support spindles rotatably mounted on said carrier in evenly spaced relation to each other, a series of gear testing assemblies mounted on said base in a spaced relationship to each other along said carrier path which corresponds to the spacing of said spindles, means for indexing said carrier along said path to move said spindles into alignment with successive gear testing assemblies of said series thereof, gear loading means and gear unloading means mounted on said base at opposite ends of said series of testing assemblies for alignment with successive spindles of said series thereof upon indexing said carrier, said loading means including means for loading a succession of gears onto successive spindles indexed into alignment therewith, said unloading means including means for removing gears from successive spindles indexed into alignment therewith, gear classifying means mounted to receive gears removed by said unloading means, said classifying means including means defining a plurality of paths for unloaded gears and including director means for directing unloaded gears down any one of said paths, each of said testing assemblies including a gear contacting element positioned for engagement with a gear on an adjacent spindle and mounted for displacement along a predetermined path by the reaction thereon of a coacting spindle supported gear, each gear testing assembly including detector means for sensing displacement of said gear contacting element of the assembly, the gear contacting element of at least one of said assemblies being formed by a rotary testing gear adapted to mesh with an adjacent spindle mounted gear, means for rotating said testing gear and the spindle supported gear meshing therewith, means including said detector means for operating said director means in response to the degree of displacement of said gear contacting elements; and means for synchronizing operation of said indexing means, said loading means, said unloading means, and said gear testing assemblies said operation of the director means in response to said detector means also being synchronized with the movement of the gears from the testing assemblies to the director means.

References Cited in the file of this patent

UNITED STATES PATENTS

| | | |
|---|---|---|
| 1,406,193 | Kent | Feb. 14, 1922 |
| 1,476,223 | Salfisberg | Dec. 4, 1923 |
| 2,033,645 | Parkhill | Mar. 10, 1936 |

(Other references on following page)

UNITED STATES PATENTS

| | | |
|---|---|---|
| 2,339,638 | Henszey et al. | Jan. 18, 1944 |
| 2,384,518 | Aller | Sept. 11, 1945 |
| 2,419,242 | Woodberry et al. | Apr. 22, 1947 |
| 2,542,090 | Lorenz | Feb. 20, 1951 |
| 2,563,910 | Bean | Aug. 14, 1951 |
| 2,570,903 | Yost | Oct. 9, 1951 |
| 2,582,494 | Lorenz | Jan. 15, 1952 |
| 2,761,560 | Pomernacki | Sept. 4, 1956 |
| 2,771,992 | Artingstall et al. | Nov. 27, 1956 |
| 2,780,006 | Flair | Feb. 5, 1957 |
| 2,796,986 | Rajchman et al. | June 25, 1957 |
| 2,850,806 | Pomernacki | Sept. 9, 1958 |
| 2,868,344 | Shields | Jan. 13, 1959 |

OTHER REFERENCES

"Versatility Accentuated In Continuous Gear Production," Automation, April 1955, pages 47–53, by C. E. Scott.

"Continuous Blank Machining In Gear Production," Automation, June 1955, pages 26–29, J. J. McCabe.

"Gear Gage Controls Automatic Hobber," by Raymond C. Miles, Electronics, July 1956, pages 140–144.